T. COURSER.
Grain-Binder.
No. 29,063.
4 Sheets—Sheet 1.
Patented July 10, 1860.
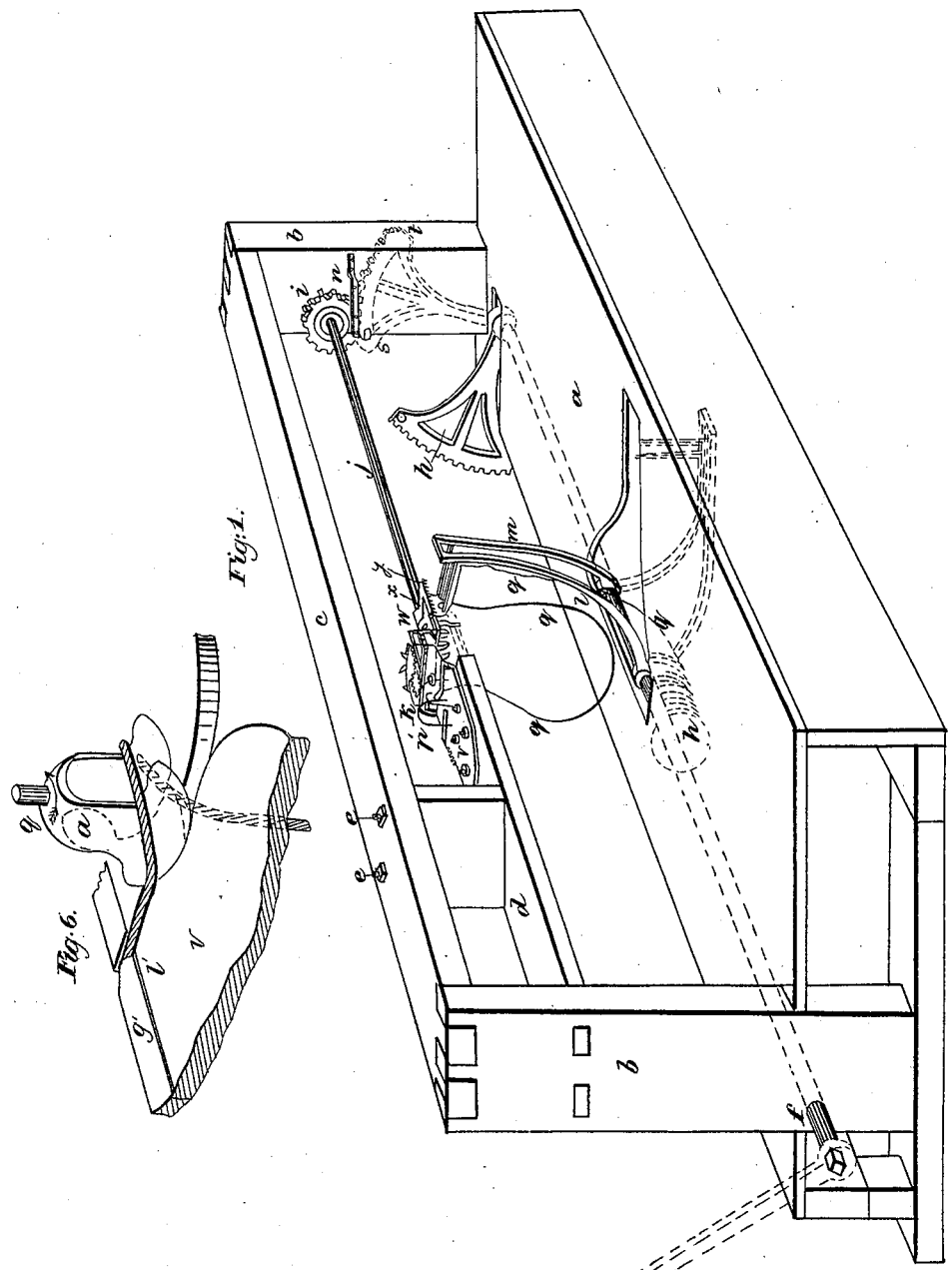
Witnesses.
E. C. Chapman
J. G. Hewitt
Inventor.
Thomas Courser T. COURSER.
Grain-Binder.
No. 29,063
4 Sheets—Sheet 2.
Patented July 10, 1860.
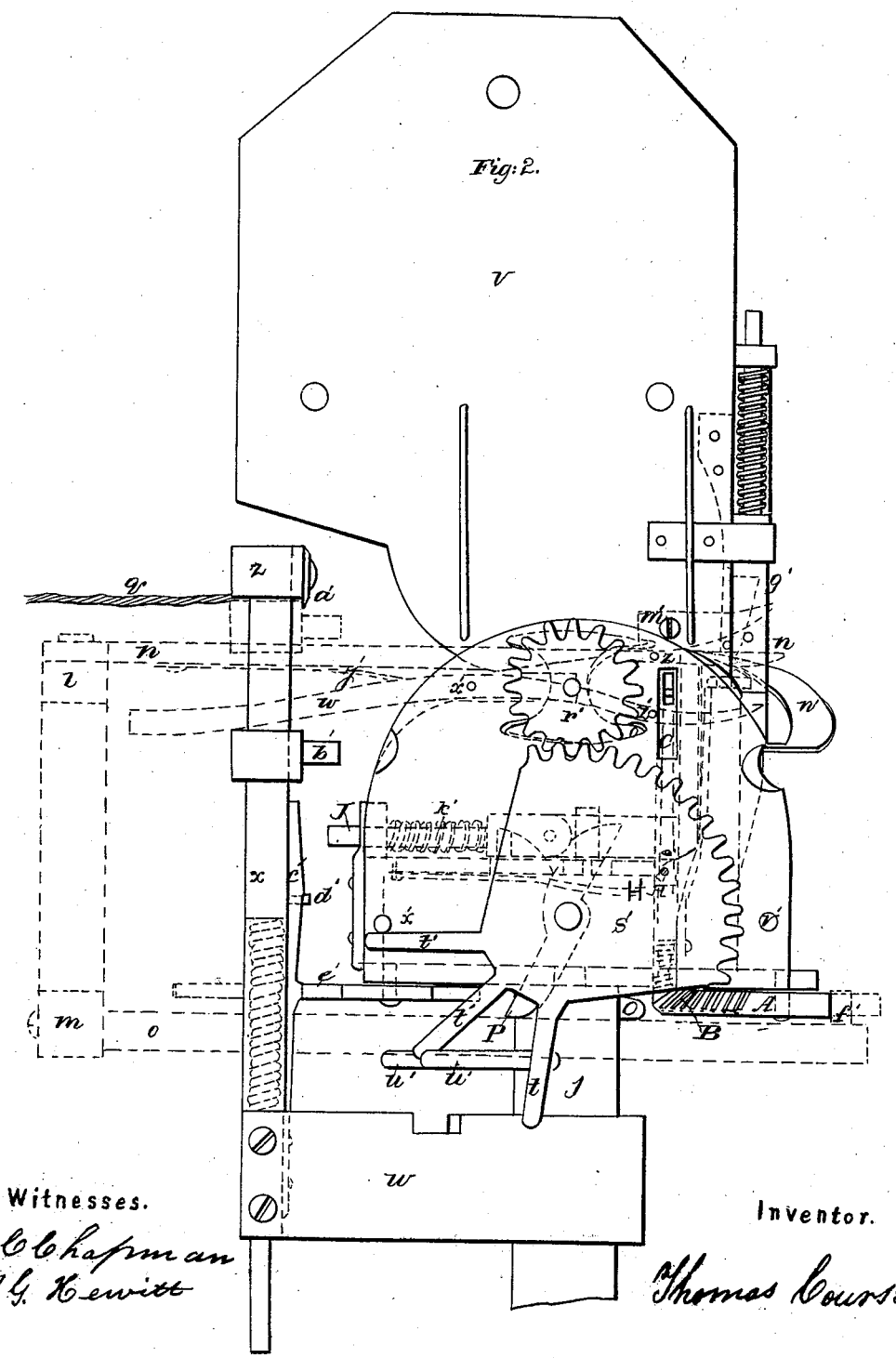
Witnesses.
E. C. Chapman
J. G. Hewitt
Inventor.
Thomas Courser

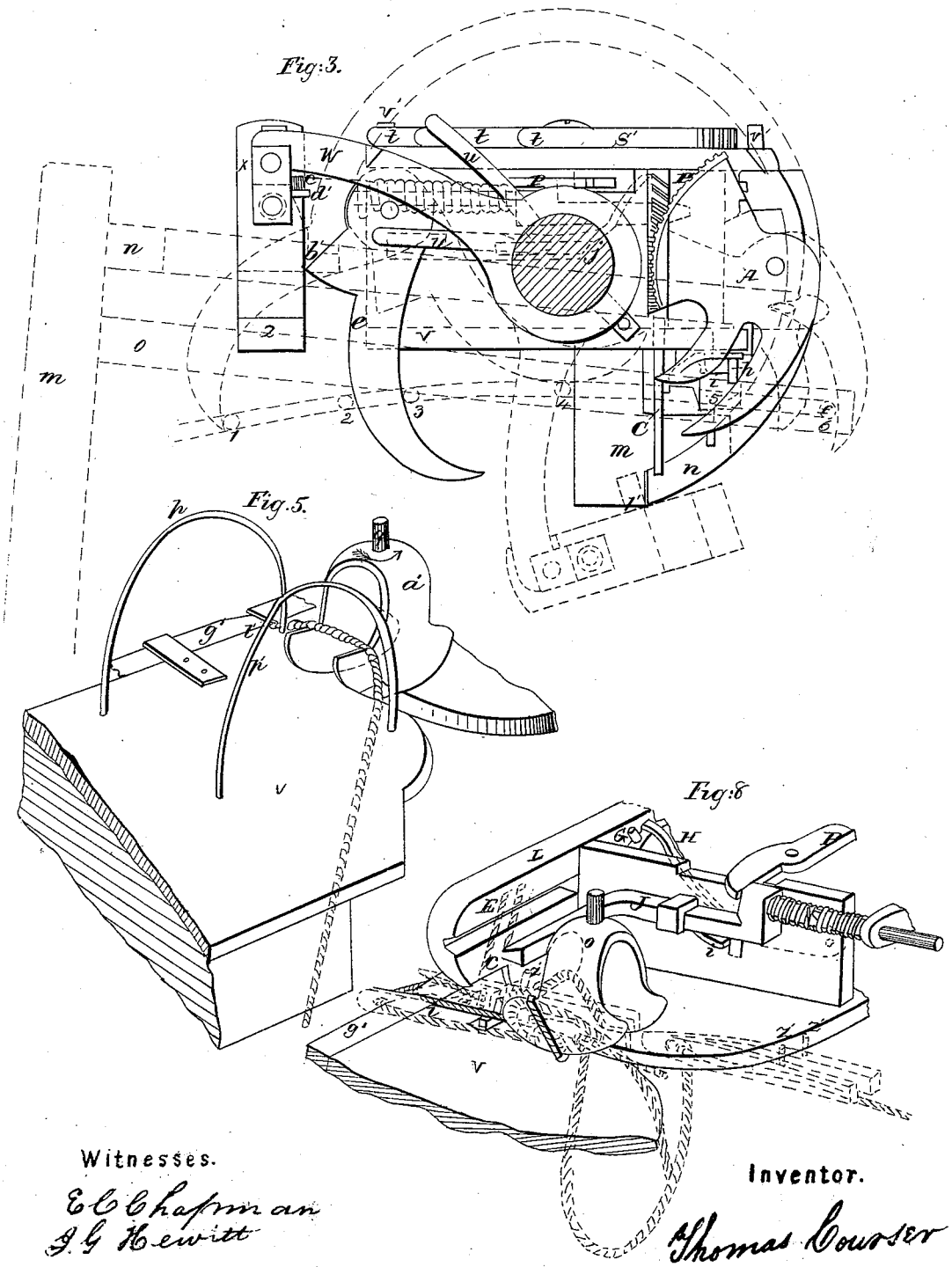

T. COURSER.
Grain-Binder.
No. 29,063
4 Sheets—Sheet 4.
Patented July 10, 1860.
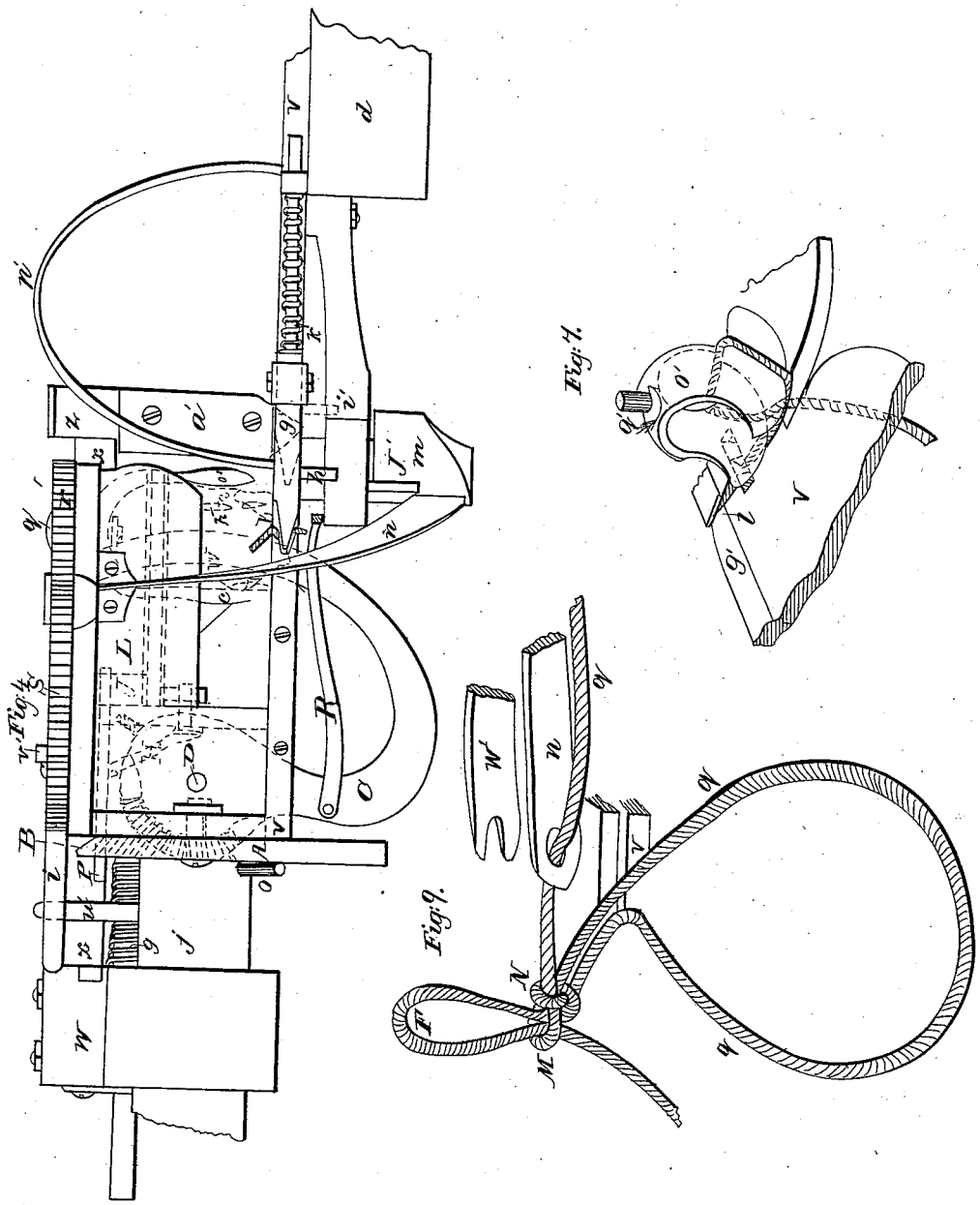
Witnesses
Inventor.

UNITED STATES PATENT OFFICE.

THOMAS COURSER, OF PRINCETON, ILLINOIS.

IMPROVEMENT IN MACHINES FOR BINDING GRAIN.

Specification forming part of Letters Patent No. 29,063, dated July 10, 1860.

*To all whom it may concern:*

Be it known that I, THOMAS COURSER, of Princeton, in the county of Bureau and State of Illinois, have invented a new and Improved Machine for Binding Grain Cut by the Ordinary Reaping-Machine; and I do hereby declare that the following is a full, clear, and exact description of the construction and operation of the same, reference being had to the accompanying drawing, and to the letters of reference marked thereon.

To enable others skilled in the art to make and use my invention, I will proceed to describe its construction and operation.

Figure 1 of the drawings is a perspective view of the machine, having a suitable frame to be attached to the platform of any reaping-machine.

*a* is the platform; *b b*, two upright posts, connected at the upper end by the beam *c*. *d* represents a horizontal plate attached to one of the posts *b*, and is suspended from the beam *c* by the bolts *e e*. *f g* represent a rocking shaft having its bearings in the posts *b b*. This shaft is placed immediately under the platform *a*. I fix the curved rack *h* to the shaft at *g*. This rack gears into the pinion *i*, as shown by the dotted lines at *s t*. The pinion *i* is fixed to the horizontal shaft *j*. *k* represents the position of the knotting apparatus, which is bolted to the plate *d*. I also fix on the shaft *f g* the curved arms *t m*. I fix to the arm *l* the compound needle *n*, which will hereinafter be more particularly described. Also, to the arm *m* I fix the stud *o*, which is furnished with a pin for the purpose of moving the cam and levers, hereinafter more particularly referred to. *p* represents a reel placed under the platform *a*. This reel contains a supply of cord or twine to be used in forming the bands. *q q q* represent the cord or twine passing from the reel *p*, along the arm *l*, and through the eye of the needle *n*; thence downward around the gavel or bundle of grain; thence upward, through the slot in the bed-plate of the knotting apparatus, to a clamp on the opposite side, where the end of the cord or twine is held while the knot is being formed, as will be hereinafter shown. *w* represents a spring attached to the post *b*, and bent so as to pass along the side of the pinion *i*. A pin is fixed to the inside of the spring, which falls into a hole made in the side of the pinion *i*. This hole is so arranged that the pin enters it at the moment the rack *h* passes out of gear. The pinion remains fixed by the pin until the return of the rack *h*. *s* represents a small roller attached to the spring *r*. An inclined plane is formed at the end of the rack *h*. At *t*, the roller *s* coming in contact with the inclined plane *t*, the spring *r* is bent outward, which withdraws the pin, and the pinion *i* is left free to revolve by the action of the rack *h*. Motion is communicated to the machine by the lever *u*.

A slot is cut in the platform *a* to allow the curved arms *l m* to pass downward to the position shown by the dotted lines, which brings the rack *h* into the position as indicated by the dotted lines at *s t*.

Fig. 2 is a top view of the apparatus for forming the knot; Fig. 3, an end view, and Fig. 4 a side view, of the same. Figs. 5, 6, 7, and 8 are parts of said apparatus in perspective, showing the different positions of the parts during the progress of tying the knot. Fig. 9 is a representation of the knot when finished.

*v* represents the bed-plate, which is secured to the plate *d* by means of bolts, as shown in the drawings. (The letters of reference apply to the same parts in each figure.) *w* is an arm of metal fixed to the shaft *j*. At the outer end of this arm I attach the feeding nippers, as shown at *x*. These nipper resemble the common monkey-wrench, the sliding-jaw being moved by a spiral spring. This spring is shown at *y*, Fig. 4. The stationary or fixed jaw of the nippers is shown at *z*, and is furnished on one side with a steel plate, having a sharp cutting-edge, as shown at *a* on Figs. 2 and 4. The movable jaw has a smooth round pin at *'b*. The spring moving this jaw is retained by the spring-catch *'c* and pin *'d*, as shown on Figs. 2 and 3. *'e* is a cam-lever operated upon by the pin *'f*, fixed to the stud *o*. This lever raises the catch *'c*, which liberates the spring *y*, which instantly moves the sliding jaw against the fixed jaw *z*, catching the cord or twine *q* between the jaws, and the cutting-edge of the blade *'a* severs the cord or twine; at the conclusion of each operation the cord or twine being held fast in the nippers, and passing thence through the eye of the needle n, as shown on Fig. 9, thence down along the arm l to the reel. The lever u being moved from left to right, the arms l m descend through the slot in the platform a, and the rack h is brought into gear with the pinion i, which causes the shaft j to revolve. The arm w carries the nippers over the top of the apparatus, (the bolt 'g being drawn back by hand for the first operation until the pin h falls into the catch at 'i.) The nippers continue to revolve until they arrive at the point indicated by the dotted lines under the apparatus, Fig. 3. The cord, being carried over the apparatus by the nippers, is brought into the space left by drawing back the bolt 'g. The pin 'b strikes the pin 'j, which is fixed in the catch 'i, which moves the catch and liberates the bolt 'g, which is forced by the spiral spring 'k. The cord is caught by the end of the bolt and firmly retained, as shown at 'l. The pin 'b, attached to the movable jaw, strikes against the fixed cam 'm, which moves the jaw and releases the end of the cord; the pin 'b presses against the spring 'n and passes beyond it, as shown at 'b, Fig. 3. The lever u is now moved from right to left, and the nippers return to their first position. But, in returning, the pin 'b passes against the inclined plane formed by the spring 'n, which slides the movable jaw until the spring-catch 'c receives the pin 'd, and the nippers are returned, as shown on Fig. 2, with the jaws set apart. But the first motion of the nippers passed the cord across the horns of the knotting-clutch 'o, as shown on Fig. 5. 'p 'p are two arches or bows of wire fixed to the bed-plate v, which gives direction to the cord, so as to insure its falling upon the horns. The clutch 'o is suspended from the upper disk or cover of the apparatus by the pin 'q, which passes through the disk and forms the axle of the pinion 'r, to which it is fixed. The pinion 'r lies flat on the upper surface of the disk. 's represents a section of a cogged wheel, also lying flat on said disk, and geared to the pinion 'r. This section is furnished with three prongs, as shown at t t t. These prongs are operated upon by the pins 'u 'u, which are fixed in the shaft j, so that the motion of the shaft j gives motion to the section 's until the prongs 't rest against the pins 'v 'v. The motion of the section causes the pinion 'r to perform exactly three-quarters of a revolution, first in one direction and then in the other. As the motion of the pinion 'r gives a corresponding motion to the clutch 'o, the first quarter of its revolution carries the cord as shown at Fig. 6, the second quarter as shown at Fig. 7, and the last quarter as shown at Fig. 8, in which position the cord has formed a square loop around the horns of the clutch 'o. The compound needle is formed of two bars of metal, one of which is fixed to the arm t; the other is curved, as shown by the dotted lines at 'w on Fig. 2, and works on a pivot, (shown at 'x,) which passes through a stud attached to the fixed bar n. A spring, 'y, is fixed between the bars, and is attached to the bar n. This spring has a tendency to keep the points of the bars in contact. These points are constructed as shown on Fig. 9, being an eye in the bar n, and a slot in the end of the bar 'w. This slot conforms to the eye when the points are in contact. 'z 'z represent two pins, one in each bar of the needle. The machinery being in the position as shown at Fig. 1, the lever u is pressed downward to the left, which causes the needle n to pass forward between the jaws of the nippers, and through and between the sides of the clutch 'o, passing directly through the square loop of the cord, as shown on Fig. 8. At this point the curved bar 'w comes in contact with the sliding jaw of the nipper, which causes the points of the bars n 'w to separate, as shown on Figs. 2, 8, and 9, the cord passing across the space between the points, through the eye, and in the slot, as shown on Fig. 8. At the same time the needle is passing through the apparatus the stud o is carried forward, and the pin 'f passes forward in the curve indicated by the points 1 2 3 4 5 6 on Fig. 3. At the point 2 the pin comes in contact with the convex edge of the lever 'e, and carries it upward to the point 4, where the pin passes the lever, and allows it to drop by its own gravity to its original position. The pin f, at 5, comes in contact with the slotted cam A, and passes onward to 6, forcing the cam A into the position as shown by the dotted lines. The cam A is furnished with cogs, forming a section of a beveled wheel, as shown at B, which are geared into similar cogs on the curved loop-lever C. Therefore the motion of the pin 'f from 5 to 6 causes the lever C to turn on its axle or fulcrum D, and the forked end of the lever passes upward, (also the hand R comes in contact with the pin h, and presses the bolt 'g until the pin 'h passes into the catch at 'i, this releases the cord at 'e,) through a slot in the bed-plate v, to the top of the apparatus. The effect of this motion is, that the forked end of the lever carries up the cord with it, coming against the cord, as shown at Fig. 7, and carrying it up, as shown at E on Fig. 8. This eventually forms the bow of the knot, as shown at F on Fig. 9. The movement of the lever C brings the pin G in contact with the lever H, which removes the catch I, Fig. 8, and releases the right-angled clamp-bolt J, which, being pressed by the spiral spring K, catches the upper portion of the lever C, and, together with the cord, presses it against the side frame of the apparatus "L. The pin 'f, in passing back from 6 to 4, reverses the motion of the cam A, which is brought to its original position, and the lever C being moved at the same time, the forked end is withdrawn. The pressure of the bolt J retains the loop of the cord, and as soon as the lever C is withdrawn the loop is pressed by the bolt J into the groove formed in the side forme L, where it is held until the knot is formed. The pins 'z 'z, in passing through the square loop around the clutch, come in contact with the upper side of the loop, and, pressing forward, carry the loop off the horns of the clutch, and press the upper thread against the lever C. The needle being now drawn back, that part of the cord in the points forms the bight of the knot at M, Fig. 9, and the cord moved by the pins z z forms the gripe of the knot at N, Fig. 9. The needle being entirely withdrawn, the knot is formed as shown at Fig. 9, the bow of the knot being still held by the bolt J. At the same time the needle is being withdrawn, the stud o carries the pin 'f from 6 to 1. This pin, at the point 3, comes in contact with the concave edge of the lever 'e, and carries it to the point 1, which brings the lever in contact with the catch-spring 'c, and, raising it, releases the movable jaw of the nipper, and the cord is cut off, and the end grasped by the nippers for a second operation. The nipper being carried over as first described, the pin o, fixed in the shaft J, comes in contact with the lever P, which withdraws the bolt J until it is caught by the retaining device I. The first knot is released from the machine by the movement of the bolt J, which completes the operation.

When the pin b in the movable jaw of the nipper stands at the cam $m''$, as shown on Fig. 3, and the curved arm $l\,m$, as shown by the dotted lines on Fig. 1, the sheaf of grain should be placed immediately under the knotting apparatus before moving the lever $u$ from left to right, which will enable the horns of the clutch 'o to retain the cord in forming the loop around them.

What I claim as my invention, and desire to secure by Letters Patent, is—

The knotting apparatus composed of the several parts specified, when the said parts are constructed and arranged for joint operation in the manner and for the purposes described.

THOMAS COURSER.

Witnesses:
ELIJAH HARRIS,
ISAAC WILSON.